United States Patent [19]
Nagashima et al.

[11] Patent Number: 5,913,011
[45] Date of Patent: Jun. 15, 1999

[54] VIDEO SIGNAL RECORDING APPARATUS

[75] Inventors: Yoshitake Nagashima, Chigasaki; Koji Takahashi, Yokohama; Ryo Fujimoto, Kawasaki, all of Japan

[73] Assignee: Canon Kabushiki Kaisha, Tokyo, Japan

[21] Appl. No.: 08/387,590

[22] Filed: Feb. 13, 1995

Related U.S. Application Data

[63] Continuation of application No. 08/090,477, Jul. 12, 1993, Pat. No. 5,461,485, which is a continuation of application No. 07/956,598, Oct. 5, 1992, abandoned, which is a continuation of application No. 07/638,353, Jan. 4, 1991, abandoned, which is a division of application No. 07/624,513, Dec. 7, 1990, Pat. No. 5,130,860, which is a continuation of application No. 07/369,330, Jun. 21, 1989, abandoned, which is a division of application No. 06/937,872, Dec. 4, 1986, abandoned.

[30] Foreign Application Priority Data

Dec. 10, 1985 [JP] Japan ................... 60-276124
Dec. 10, 1985 [JP] Japan ................... 60-276125
Apr. 30, 1986 [JP] Japan ................... 61-98051

[51] Int. Cl.$^6$ ................ H04N 5/76; H04N 5/77
[52] U.S. Cl. ............. 386/120; 386/121; 358/906
[58] Field of Search ................. 358/335, 906, 358/909.1, 341, 343; 360/35.1, 33.1, 19.1; 386/107, 117, 120, 121, 46, 95, 96; H04N 5/76

[56] References Cited

U.S. PATENT DOCUMENTS 4,604,668  8/1986  Lemelson .................. 358/335
4,691,253  9/1987  Silver ...................... 358/906
4,703,369  10/1987  Moriyama et al. ............ 358/343

*Primary Examiner*—Thai Tran
*Assistant Examiner*—Huy Nguyen
*Attorney, Agent, or Firm*—Robin, Blecker & Daley

[57] ABSTRACT

A video signal recording apparatus which records a video signal on a recording medium after separating a fixed time portion of an input video signal and extending the time axis of the separated video signal.

16 Claims, 13 Drawing Sheets

VIDEO SIGNAL RECORDING APPARATUS

This application is a continuation of application Ser. No. 08/090,477, filed Jul. 12, 1993, now U.S. Pat. No. 5,461, 485; which is a continuation of Ser. No. 07/956,598, filed Oct. 5, 1992, abandoned, which is a continuation of Ser. No. 07/638,353, filed Jan. 4, 1991, abandoned, which is a division of Ser. No. 07/624,513, filed Dec. 7, 1990, now U.S. Pat. No. 5,130,860, which is a continuation of Ser. No. 07/369,330, filed Jun. 21, 1989, abandoned, which is a division of Ser. No. 06/937,872, filed Dec. 4, 1986, abandoned.

BACKGROUND OF THE INVENTION

1. Field of the Invention

The present invention relates to a video signal recording apparatus, and, more particularly, to a video signal recording apparatus suitable for recording a still picture.

2. Description of the Related Art

Heretofore, in this type of recording and reproducing apparatus there has been no combined-use apparatus which is capable of recording by distinguishing a motion picture and a still picture. However, if we dare to cite such an apparatus, a presently available one is merely such that a still picture is reproduced simply in the so-called reproduction pause mode or the like as one frame in a motion picture by using a magnetic recording and reproducing apparatus (VTR) for motion picture use which uses a magnetic tape as a recording medium. However, the quality of the still picture is in most cases inferior to that of the motion picture.

On the other hand, a recording apparatus exclusively used for the still picture has been conceived. In this case, however, if, for instance, an attempt is made to record one field of a television signal with high fidelity on a real-time basis as a digital signal, for example, a super-high speed digital processing circuit and the like are required, so that the apparatus becomes large. In addition, when recording is effected as an analog signal, it is impossible to expect for a substantial improvement in the quality of the picture.

With reference to FIG. 1, description will be made of reproduction of the still picture in a conventional so-called 8 mm VTR which employs a 8 mm-wide magnetic tape.

In FIG. 1, reference numeral 1 denotes a magnetic tape (hereafter referred to as the "tape"); 102, a pinch roller; 103, a capstan motor; 104, a rotary drum; 106, a frequency signal (drum FG) generator concerning the rotational speed of the drum 104; 105, a pulse (PG) generator concerning the rotary phase of the drum 104; 107, 108, 112, 114, 115, and 119, amplifiers, respectively; 109, a drum phase control circuit; 110, a drum speed control circuit; 111, 118, adders, respectively; 116, a tracking error (ATF) signal generator; 113, a frequency signal (capstan FG) generator relating to the rotational speed of the capstan motor 103; 117, a capstan speed control circuit; and 120, 121, magnetic heads (hereafter referred to as the "head"), respectively.

In FIG. 1, a phase error signal from the phase control circuit 109 and a speed error signal from the speed control circuit 110 on the basis of a drum PG and a drum FG are added by the adder 111, and the rotary drum 104 is driven by this added signal. Consequently, the rotation of the drum 104 is controlled such as to compensate for their errors.

Meanwhile, the capstan motor 103 effects tracking control using a speed error signal supplied from the speed control circuit 117 obtained on the basis of the capstan FG as well as an ATF (automatic tracking finding) signal supplied from the ATF signal generator 116 using a known 4-cycle pilot system.

In the state of reproduction of the still picture, control is effected by means of the circuit shown in FIG. 1 in such a manner that the head traces the magnetic tape as in the case of (i) or (ii) of FIG. 2.

FIG. 2 is a diagram illustrating the condition of tape tracing by the heads during (i) the so-called frame still reproduction and (ii) the so-called field still reproduction. Description will be made hereafter with reference to FIG. 2.

In FIG. 2:

(i) In the frame still reproduction, two fields are reproduced alternately, and, using two heads A, B, only the tracks whose azimuth coincides with those of the heads A, B are reproduced alternately. For this reason, a reproduction area per field in both cases becomes approximately one half less than in the case of normal reproduction, as shown in the drawing, with the result that the signal-to-noise ratio drops. In addition, since the video signals of these two fields have a time difference of $\frac{1}{60}$, there is a possibility of the still picture becoming blurred in a scene in which the movement is fast.

(ii) In the field still reproduction, only one field of the video signals constituting one frame out of two fields is reproduced repeatedly by means of heads exclusively used for the still picture (i.e., two heads having a 180° phase difference and an identical azimuth). Consequently, blurring as found in the frame still reproduction does not occur. However, in comparison with normal reproduction, a drop in the signal-to-noise ratio, and a deterioration in the vertical resolution are basically unavoidable.

In terms of human visual characteristics, high picture quality is generally required for the still picture compared with the motion picture. Furthermore, in the case of the still picture, since it is conceivable that the picture may be printed out and viewed in a fixed form on a sheet, higher picture quality is required. However, the still picture using a conventional VTR has a drawback in that the picture quality becomes aggravated in comparison with the motion picture for the aforementioned reasons.

Furthermore, as described above, it has been difficult to obtain high-quality pictures even in recording apparatus exclusively used for the still picture.

SUMMARY OF THE INVENTION

Accordingly, it is a primary object of the present invention to overcome the aforementioned drawbacks of the prior art.

Another object of the present invention is to provide a video signal recording apparatus which is capable of recording high-quality still picture signals with a simple arrangement.

To this end, the present invention provides, in accordance with one aspect of the invention, a video signal recording apparatus, comprising: input means for inputting a video signal; separating means for separating a fixed period portion of the video signal input by said input means; time axis extending means for extending the said time axis of the fixed period of the video signal separated by the separating means; and recording means for recording on a recording medium the video signal with the time axis extended by the time axis extending means.

A still another object of the present invention is to provide a recording apparatus which can be used as a recording apparatus for the still picture and as a recording apparatus for the motion picture.

To this end, the present invention provides, in accordance with another aspect of the invention, a video signal recording apparatus, comprising: first generating means for generating a video signal including one picture portion of information per fixed period; second generating means for generating one picture portion of the video signal over a longer period than the fixed period; and recording means for recording on a common recording medium the video signal generated by the first generating means and the video signal generated by the second generating means.

A further object of the present invention is to provide a digital recording apparatus which can be used as a recording apparatus for recording both video signals and audio signals.

To this end, the present invention provides, in accordance with a still another aspect of the invention, an information signal recording apparatus, comprising: first generating means for generating a video signal including picture information; second generating means for generating an audio signal including audio information; selection means for alternately outputting the video signal and the audio signal; signal processing means for converting the form of the signal output by the selection means; and means for recording on a recording medium the signal output by the signal processing means.

The above and other objects and features of the present invention will become apparent from the following detailed description of the embodiments thereof taken in connection with the accompanying drawings.

DETAILED DESCRIPTION OF THE PREFERRED EMBODIMENTS

First, description will be made of a basic concept with respect to embodiments of the present invention when applied to a VTR.

In terms of the bandwidth, the optical system of a commercially available video camera has leeway for the motion picture recording by a VTR. Therefore, using the same optical system, a signal is supplied to a signal processing circuit of a still picture system which is separate from a signal processing circuit of a motion picture system. In this signal processing circuit of the still picture system, recording is effected by providing digital processing after extending the time axis of the supplied signal. Consequently, a wide-band still picture signal can be recorded in a recordable band. As for a digital recording format at this juncture, part of the signal processing circuit can be used commonly by effecting a recording in a manner based on a recording format of a PCM audio signal of an 8 mm VTR. However, identifying (ID) signal data which indicates that the signal is a still picture signal is recorded in advance, as will be described later.

It should be noted that, since, during the same period, the amount of data for the still picture is substantially different from the amount of data for sound, a video signal which has underwent analog-digital conversion is stored temporarily in a frame memory at a timing corresponding to shutter release in a camera. Subsequently, the digital video data is read from the frame memory at a transmission rate corresponding to the recordable band, and is recorded on a tape.

Figure 3:
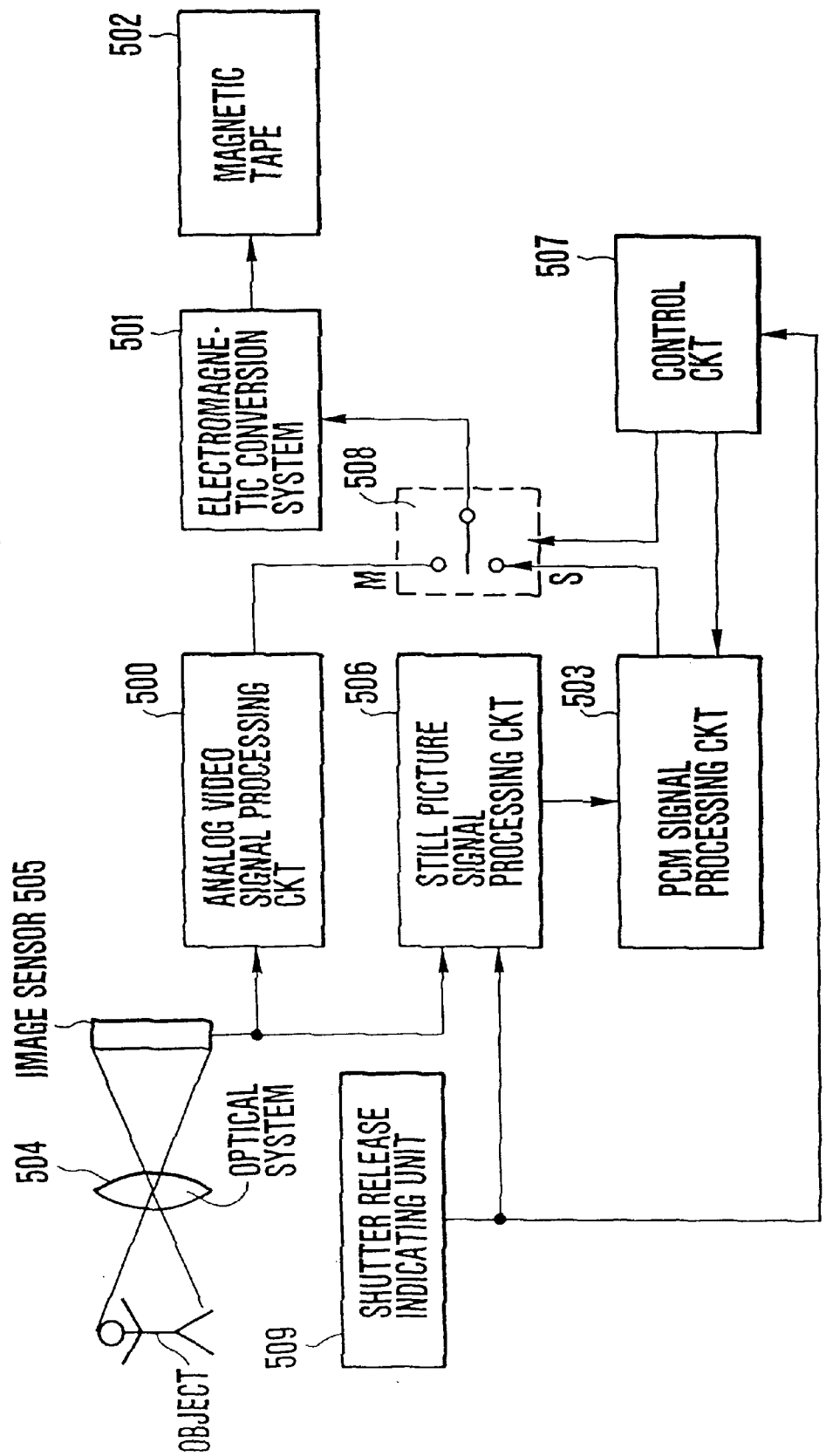
FIG. 3 is a schematic diagram illustrating a recording apparatus in accordance with an embodiment of the present invention.

FIG. 3 is a block diagram illustrating a schematic arrangement of a recording apparatus in accordance with the present invention, in which reference numeral 500 denotes an analog video signal processing circuit for the motion picture; 501, an electromagnetic conversion system; 502, a magnetic tape; 503, a PCM signal processing circuit; 504, an optical system; 505, an image sensor; 506, a digital video signal processing circuit for the still picture; 507, a control circuit; 508, a switch (changeover circuit); and 509, a shutter release instructing unit.

In the apparatus shown in FIG. 3, the three circuits of the still picture signal processing circuit 506, the control circuit 507 for still picture signals, the changeover circuit 508 for changing over the motion picture and the still picture are added to the circuit configuration of a conventional camera-integrated-type 8 mm VTR, and the shutter release instructing unit 509 is further provided.

Figure 4:
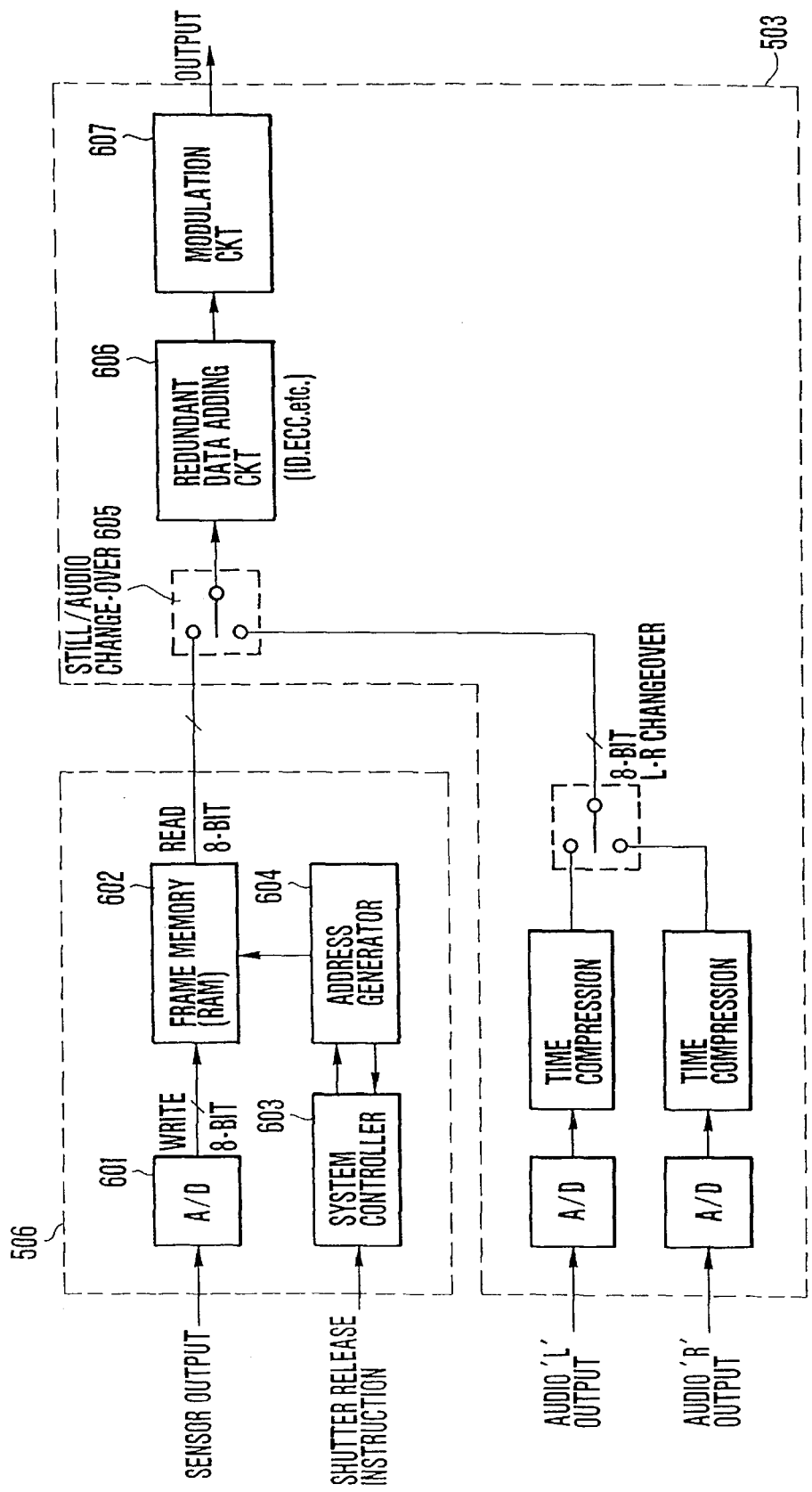
FIG. 4 is a block diagram illustrating the details of a still picture signal processing circuit and a PCM processing circuit.

FIG. 4 shows the details of the still picture signal processing circuit 506 and the PCM signal processing circuit 503 shown in FIG. 3. In the drawing, reference numeral 601 denotes an analog/digital converter (hereafter referred to as the "A/D converter"); 602, a frame memory constituted by a RAM; 603, a system controller; 604, an address generator; and 605, a switch.

Description of the operation of the present embodiment will be made hereafter. First, an image is formed on the sensor 505 by the optical system, and its output is supplied to the A/D converter 601. All the data digitalized by the A/D converter are stored temporarily in the frame memory 602. The control of writing in the frame memory 602 is effected by the system controller 603 and the address generator 604.

At this point of time, if an instruction for shutter release is given by the instructing unit 509 to the system controller 603, an address reset instruction is sent to the address generator 604, and writing is started beginning with an initial address in the frame memory 602. When the writing is completed, a signal of a completion pulse is returned to the system controller 603. On receiving this completion pulse, the controller 603 gives an instruction for low-speed reading. The low speed referred to here means that the transmission rate is low, and, in terms of the time axis, this involves extension of the time axis.

Figure 1:
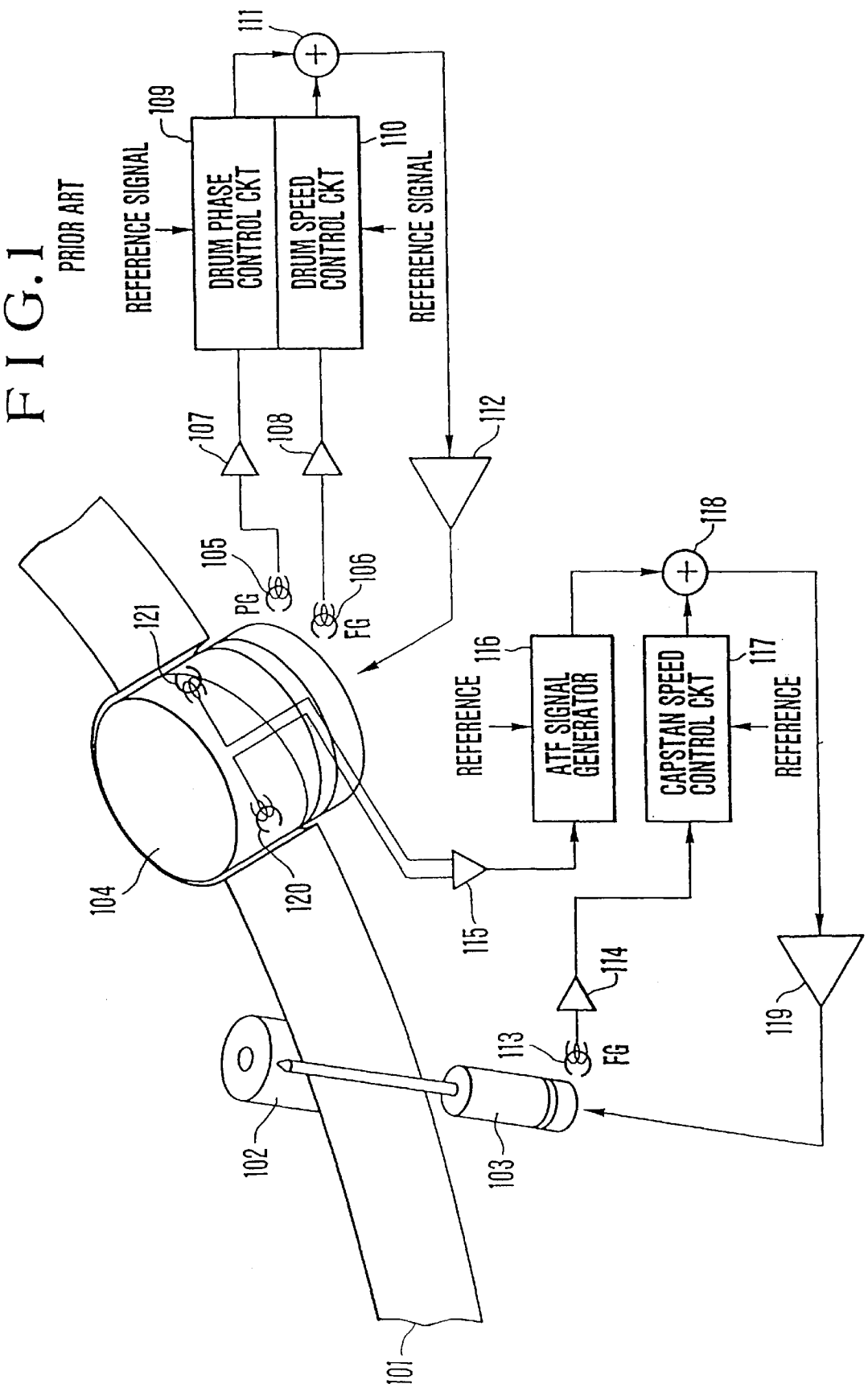
FIG. 1 is a schematic diagram illustrating the essential components of a conventional VTR.
Figure 2:
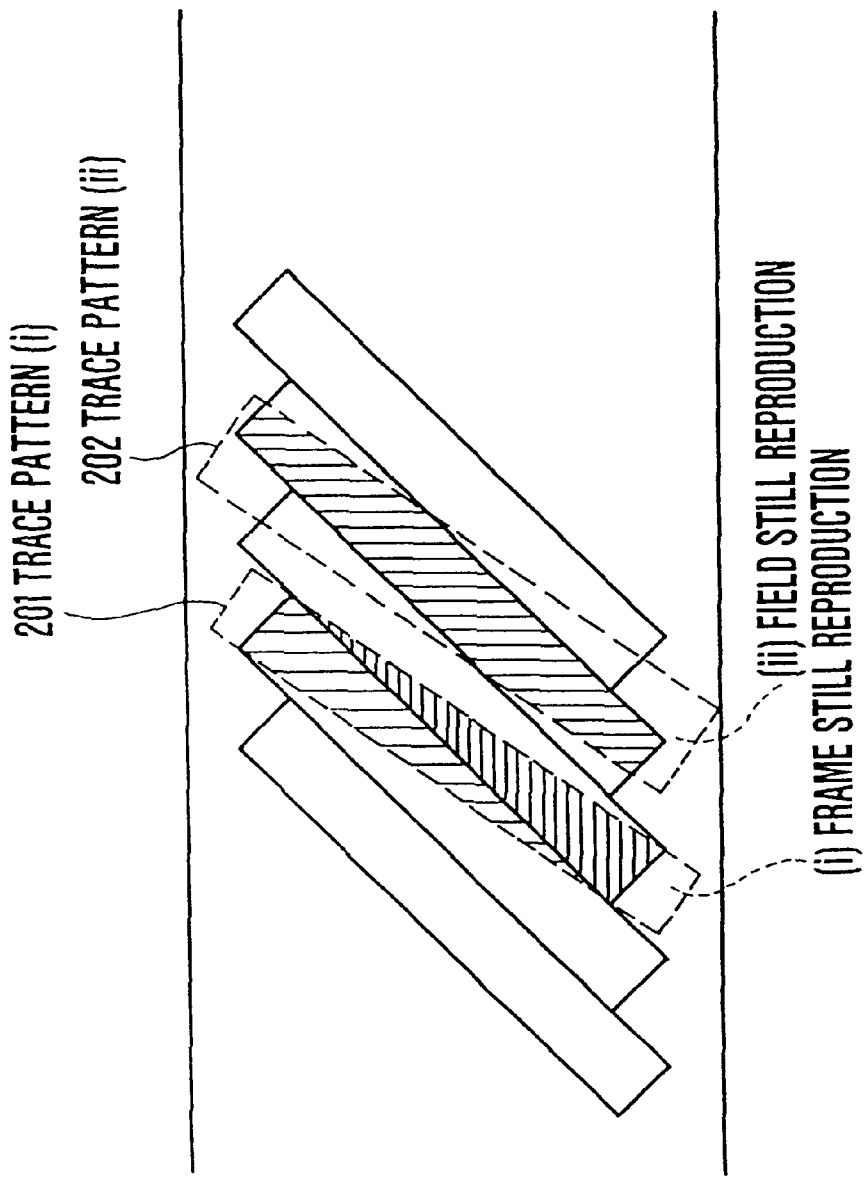
FIG. 2 is a diagram illustrating a positional relationship between the tape and heads during still reproduction in the conventional VTR.

Subsequently, a signal which has been read is supplied to a redundant data adding circuit 606 in the PCM signal processing circuit 503 via the switch 605 for still video/audio changeover. After a redundant code, such as an ID code or an error correction code (ECC), has been added, the signal is subjected to modulation by a modulation circuit 607, and is supplied to an S-side terminal of the changeover switch 508 (see FIG. 1).

The processing of the output signal of the switch 508 is carried out in the same manner as in the conventional 8 mm VTR, and the output signal is recorded by the electromagnetic conversion system 501 in a given region on the tape 502. A further description of this recording region will be made later.

Description will now be made of the amount of data of video signals of the still picture.

Figure 5:
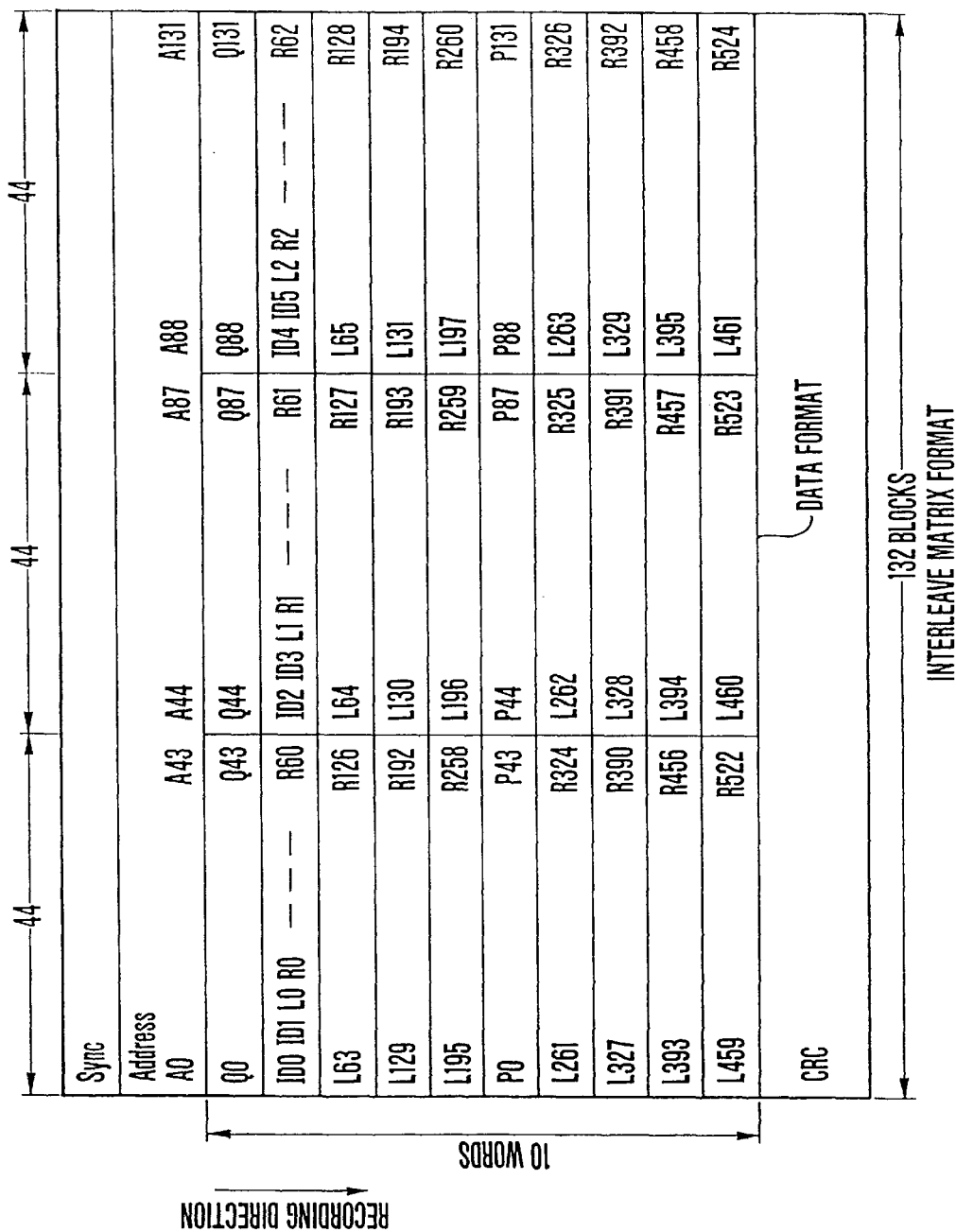
FIG. 5 is a diagram illustrating a recording format of PCM audio signals in a 8 mm VTR.

FIG. 5 shows a recording format of PCM audio signals in the 8 mm VTR.

Figure 6:
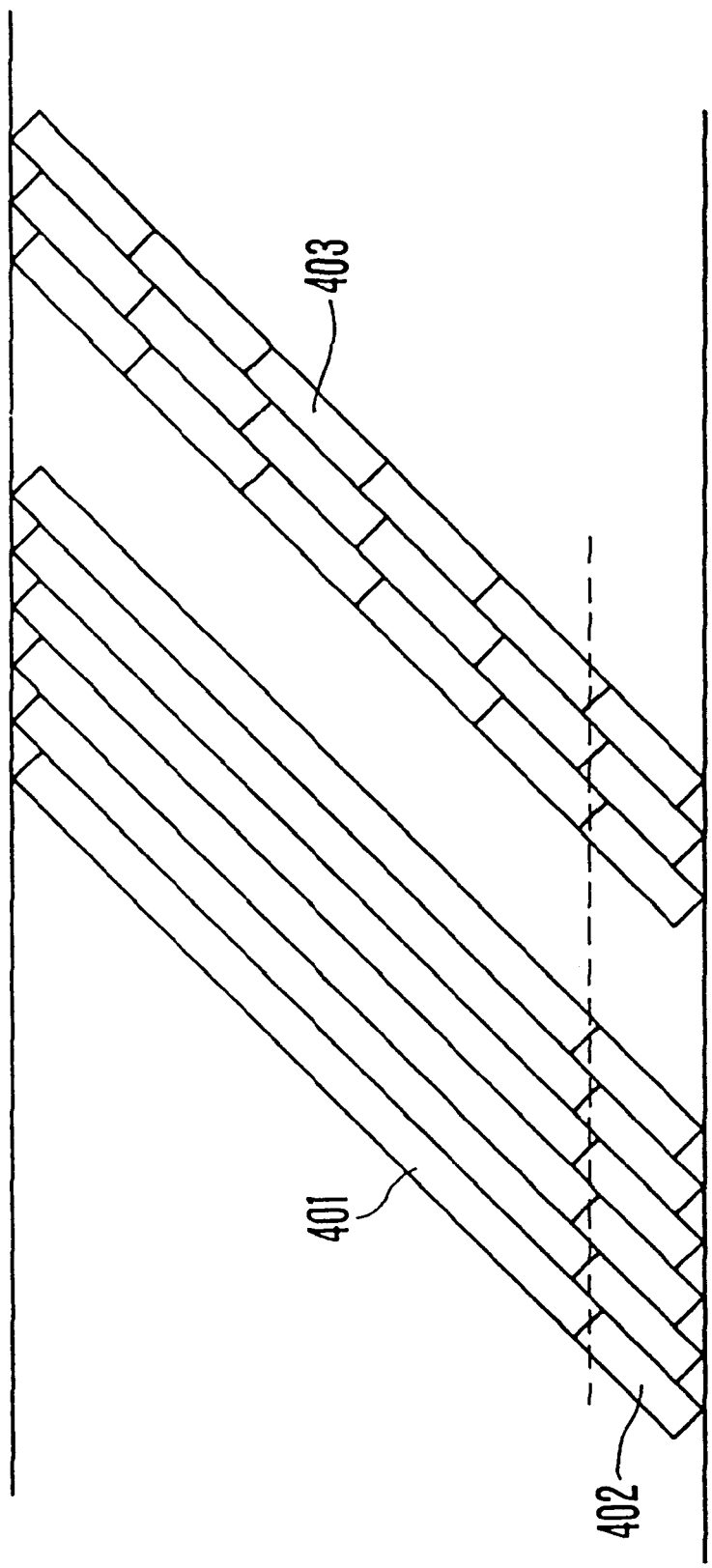
FIG. 6 is a diagram illustrating recording patterns on a magnetic tape.

In FIG. 5, Sync denotes data for synchronization; A0–A131, address data; ID0–ID5, adding data; R0–R524, audio data for the right channel (R); L0–L524, audio data for the left channel (L); Q0–Q131, P0–P131, redundant data for error correction; and CRC, a known cyclic code for detecting an error. R0–R524 and L0–L524 are data words of 8 bits each. These are recorded per field period of video signals. In FIG. 6, reference numeral 401 denotes a region where analog video signals of one field are recorded in one track, while numeral 402 denotes a region where PCM audio signals which have been compressed on the time axis of one field period per track are recorded in the aforementioned format.

Accordingly, 1050 words of information can be recorded for each field if the channels L, R of stereo signals are combined. Since one word equals 8 bits, if the video signals are quantized by 8 bits, the video signals are equivalent to an amount of data for one picture element. If it is assumed that the number of picture elements to be digitalized is 500×500 or thereabout, according to the component system in which digitalization is carried out independently for the three colors of R, G and B, one frame becomes 500×500×3 words. Since the number of words in the audio region per minute is 1050×60 words, recording time of (500×500×3)/(1050×60)≈12 is required per frame so as to record the still picture according to this format.

In addition, in the composite system in which digitalization is effected without separating luminance signals and chrominance signals, if sampling frequency is assumed to be 3 fsc, approximately 6 minutes is required (fsc is a color subcarrier frequency).

Therefore, if a format in which six-channel audio signals are recorded by providing in each track six portions for effecting such recording is used by employing the motion picture recording region in the conventional manner, the amount of information recordable per field period becomes six-fold, so that the time required for recording decreases to one-sixth. Accordingly, in this case, the recording time becomes two seconds in the component system, and approximately one second in the composite system with a sampling frequency of 3 fsc.

FIG. 6 shows a recording pattern on the magnetic tape using the apparatus shown in FIG. 3. In the drawing, reference numeral 401 denotes a region where the analog motion picture signal is recorded, as described before, and numeral 402 denotes a region where the PCM audio signal or digital still picture signal is recorded. In addition, reference numeral 403 denotes a recording region for the digital still picture signal in the case where six regions are established in one track, as described above.

As shown in FIG. 6, the recording pattern relating to the regions 401 and 402 can be obtained by controlling the switch 508 shown in FIG. 3, as necessary. However, since FIG. 3 is a schematic drawing, if the present invention is applied to a VTR of the rotating two-head helical scan type, a pair of the switches 508 are required for the respective heads. In addition, the recording pattern relating to the region 403 can be obtained if six sets of the still picture signal processing circuit 506 and PCM signal processing circuit 503 are prepared.

Figure 7:
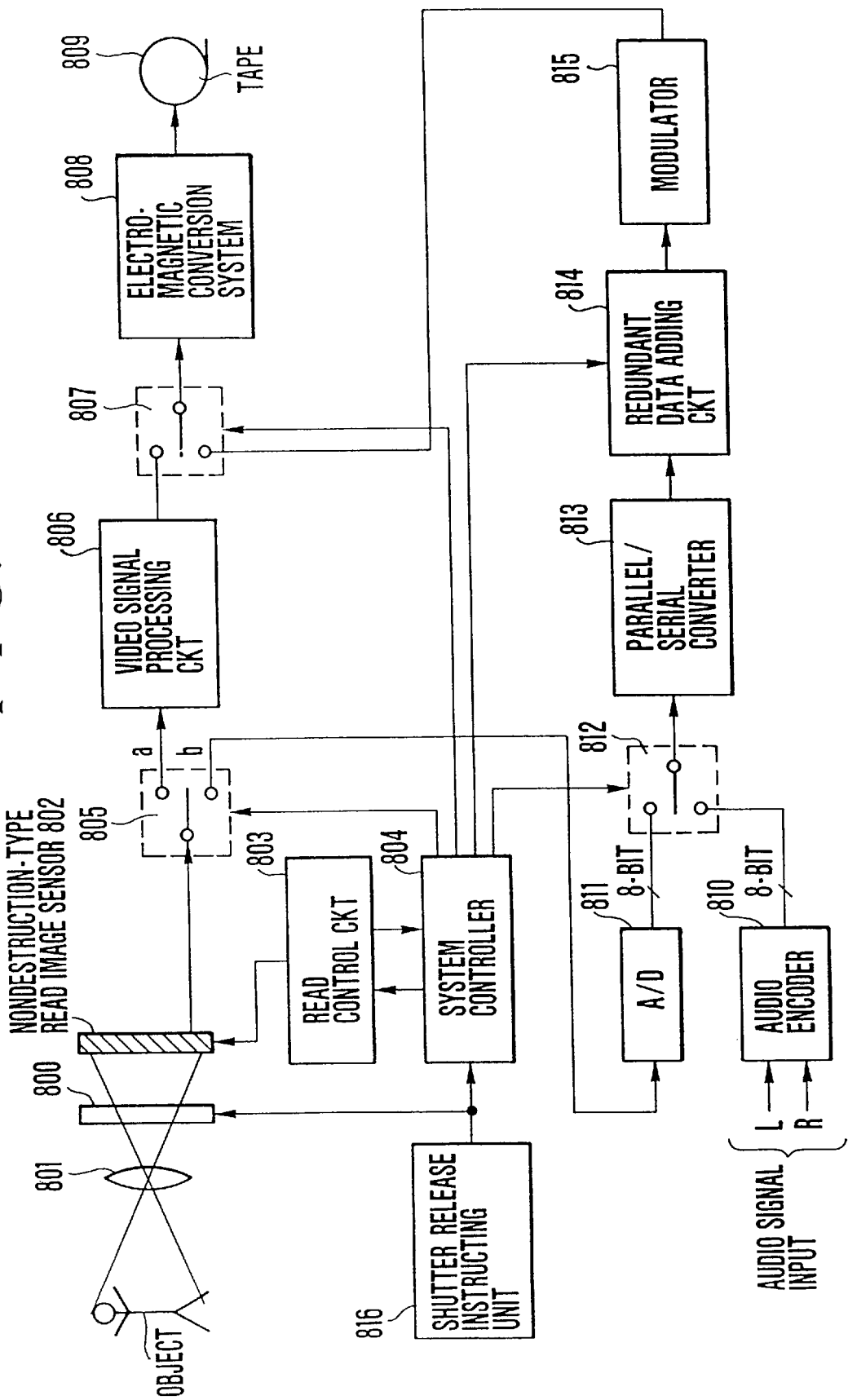
FIG. 7 is a schematic diagram of a recording apparatus in accordance with another embodiment of the present invention.

FIG. 7 is a block diagram of a recording apparatus in accordance with a another embodiment of the present invention, which employs a circuit configuration in which a pickup device and the frame memory of the video signal are used commonly in order to make the pickup system compact.

In FIG. 7, reference numeral 801 denotes an optical system; 803, a read control circuit; 804, a system controller; 805, 807, 812, switches, respectively; 806, an analog video signal processing circuit; 808, an electromagnetic conversion system; 809, a tape; 810, an audio encoder; 811, an A/D converter; 813, a parallel/serial converter; 814, a redundant data adding circuit; 815, a digital modulator; and 802, an image sensor which will be described in detail below.

Now, an image of an object is formed on the image sensor 802 via the optical system 801. The image sensor 802 is a nondestruction-type reading device. With this type of device, even if the video signal is read, its content is not destroyed and stored in it, so that the device itself has a memory function. By making use of this memory function, it becomes possible to omit the digital frame memory in the apparatus shown in FIG. 3.

The reading of the image sensor 802 which also serves as a memory is effected by the read control circuit 803 for exclusive use. The read control circuit 803 is controlled by the system controller 804. In addition, the system controller 804 changes over the switches 805, 807, 812 for changing over information.

When a user is attempting to record a motion picture and is carrying out operations required for it, the shutter 800 constantly remains open, and video signals corresponding to the motion picture are read consecutively from the image sensor 802.

At that time, the switch 805 is connected to the 'a' side, and the information which has been read from the image sensor 802 is processed by the analog video signal processing circuit 806 as an analog video signal, which, after passing through the switch 807, is recorded on the tape 809 by the electromagnetic conversion system 808.

If the user attempts to record a still picture, and carries out operations required for it, the shutter 800 is closed, and, if the switch 805 is connected to the 'b' side, the information which has been read from the image sensor 802 is processed as a digital still picture signal. In other words, the data is converted into 8-bit digital data by the A/D converter 811. Apparently, this data has the same form as that of the above-described PCM audio signal processed by the audio encoder 810. These two types of signal are output alternatively by changing over the switch 812 in accordance with a recording mode designated by the system controller 804. An 8-bit parallel signal thus obtained is converted to a serial signal by the parallel/serial converter 813. Subsequently, identifying information concerning whether this signal is audio data or still picture data is written in one of the aforementioned adding data (ID0–ID8), and the redundant data adding circuit 814 adds the adding data together with an error correction code and the like. This signal is then subjected to digital modulation by the digital modulator 815, is subjected to electromagnetic conversion by the electromagnetic conversion system 808 via the switch 807, and is recorded on the tape 809.

Figure 8:
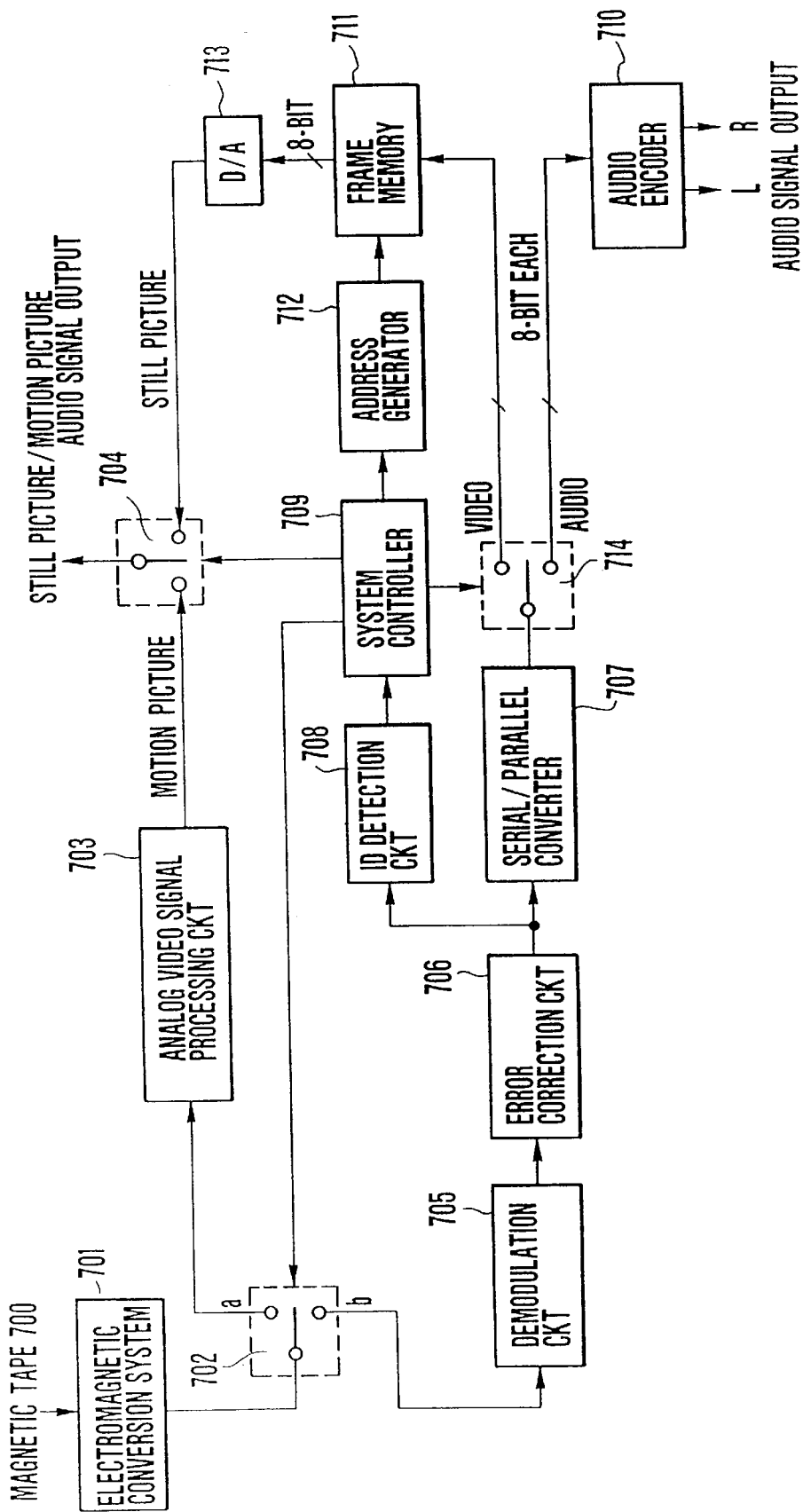
FIG. 8 is a schematic diagram of a reproducing apparatus corresponding to the recording apparatus shown in FIGS. 3 and 7.

FIG. 8 is a block diagram of a reproducing circuit corresponding to a recording apparatus such as shown in FIGS. 3 and 7. In FIG. 8, reference numeral 700 denotes a tape; 701, an electromagnetic conversion system; 702, 704, 714, switches; 703, an analog video signal processing circuit; 705, a digital demodulation circuit; 706, an error correction circuit; 707, a serial/parallel conversion circuit; 708, an ID detection circuit; 709, a system controller; 710, an audio decoder; 711, a frame memory; 712, an address generator; and 713, a digital/analog converter (D/A converter).

Data recorded in the tape 700 is reproduced as an electric signal by means of the electromagnetic conversion system 701 constituted by a head, a rotary transmitter, and the like. This signal is supplied by means of the changeover switch 702 to either the analog video signal processing circuit 703 or the digital signal processing circuit which begins with the digital demodulation circuit 705. When the switch 702 is connected to the 'a' side, the signal is subjected to analog signal processing as the motion picture, and is output via the switch 704 as an ordinary analog video signal.

On the other hand, when the switch 702 is connected to 'b' side, the signal is demodulated by the digital demodulation circuit 705 as a digital signal, its error is corrected by the error correction circuit 706, and the signal is converted from serial data to parallel 8-bit data by the serial/parallel conversion circuit 707. The switch 714 is changed over in accordance with the contents of the data, which is distributed to the audio decoder 710 or the frame memory 711 for image taking. The changeover of this switch 714 is controlled by the system controller 709 after identifying data contained in the reproduction signal concerning whether it is the audio data or still picture data is, together with other adding data, detected by the ID detection circuit 708. This system controller 709 changes over the switch 704 on the basis of an operation of an operation unit (not shown). Furthermore, the controller 709 determines the address data generated by the address data generator 712. The writing and reading with respect to the frame memory 711 are controlled in accordance with the address of this address generator 712.

Thus, a data train which has been read in a such sequence that allows reproduction of the form of video signal is supplied to the changeover switch 704 by the D/A converter 713 as an analog signal. A video signal of the still picture or motion picture is output from the switch 704 in accordance with the recording mode.

Next, description will be made of an embodiment which further reduces the recording time of the still picture. In this embodiment, when the digital still picture signal is recorded in a method similar to that of the foregoing embodiment, the number of revolutions of the heads for recording the still picture signal is increased. However, if the number of revolutions of the heads is merely increased, the angle of slant of the tracks on the tape becomes different from the case where the analog motion picture signal is recorded. For this reason, when the number of revolutions of the heads is multiplied by N (N>1), the number of revolutions of the capstan is also multiplied by N.

Figure 9:
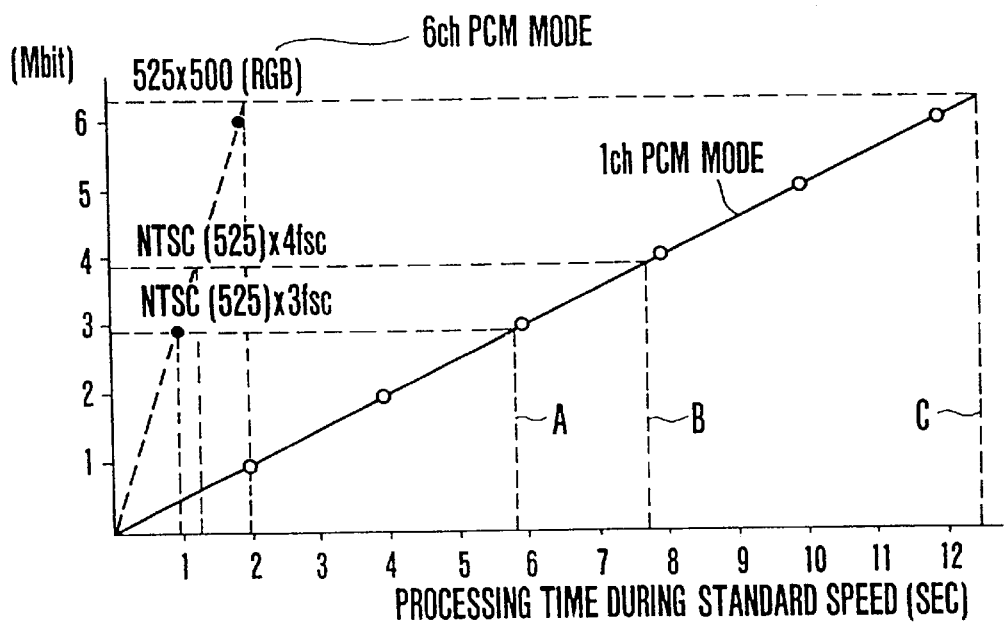
FIG. 9 is a diagram illustrating relationships between the number of data of digital still picture signals and recording time.

FIG. 9 shows relationships between the number of bits of data in the above-described embodiment and processing time as well as processing time in each sampling method. In FIG. 9, reference characters A, B and C denote the aforementioned relationships when the sampling frequency is set at 3 fsc in the composite system, when the sampling frequency is set to 4 fsc in the composite system, and the relationship based on the component system using the aforementioned number of picture elements, respectively.

In this arrangement, however, with respect to continuous shooting, the quality of the picture obtained is inferior even to a single reflex camera of the widespread type. Therefore, processing which will be described below is effected to reduce the recording time. In other words, description will be made of a case where the data of composite video signals in a manner similar to the NTSC system is recorded in the recording format of the 6-channel PCM audio signals such as described above.

As described before, the time required for recording information in the six-channel PCM format is approximately $2/3$ second, and, in a conventional VTR, recording is carried out on about 60 tracks during that time. To effect a recording on the 60 tracks, both the tape feeding speed and the rotational speed of the drum are increased. If this procedure is taken, it becomes possible to reduce the recording time in the six-channel PCM format without changing the direction of the formation of the tracks.

Figure 10:
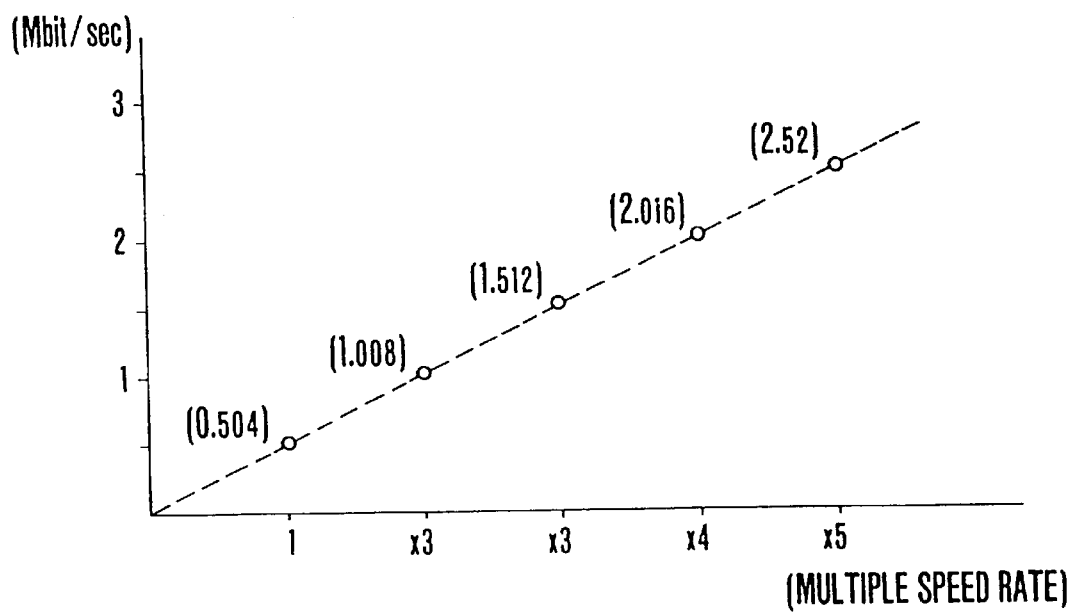
FIG. 10 is a diagram illustrating relationships between the rotational speed of a rotary head and recording time.

FIG. 10 shows relationships between the aforementioned rotational speed and the amount of recording data. The results of reducing the recording time are apparent in comparison with FIG. 9, and FIG. 10 shows that the processing capability per unit time increases with an increase in the speed.

Next, a specific example will be described.

Figure 11:
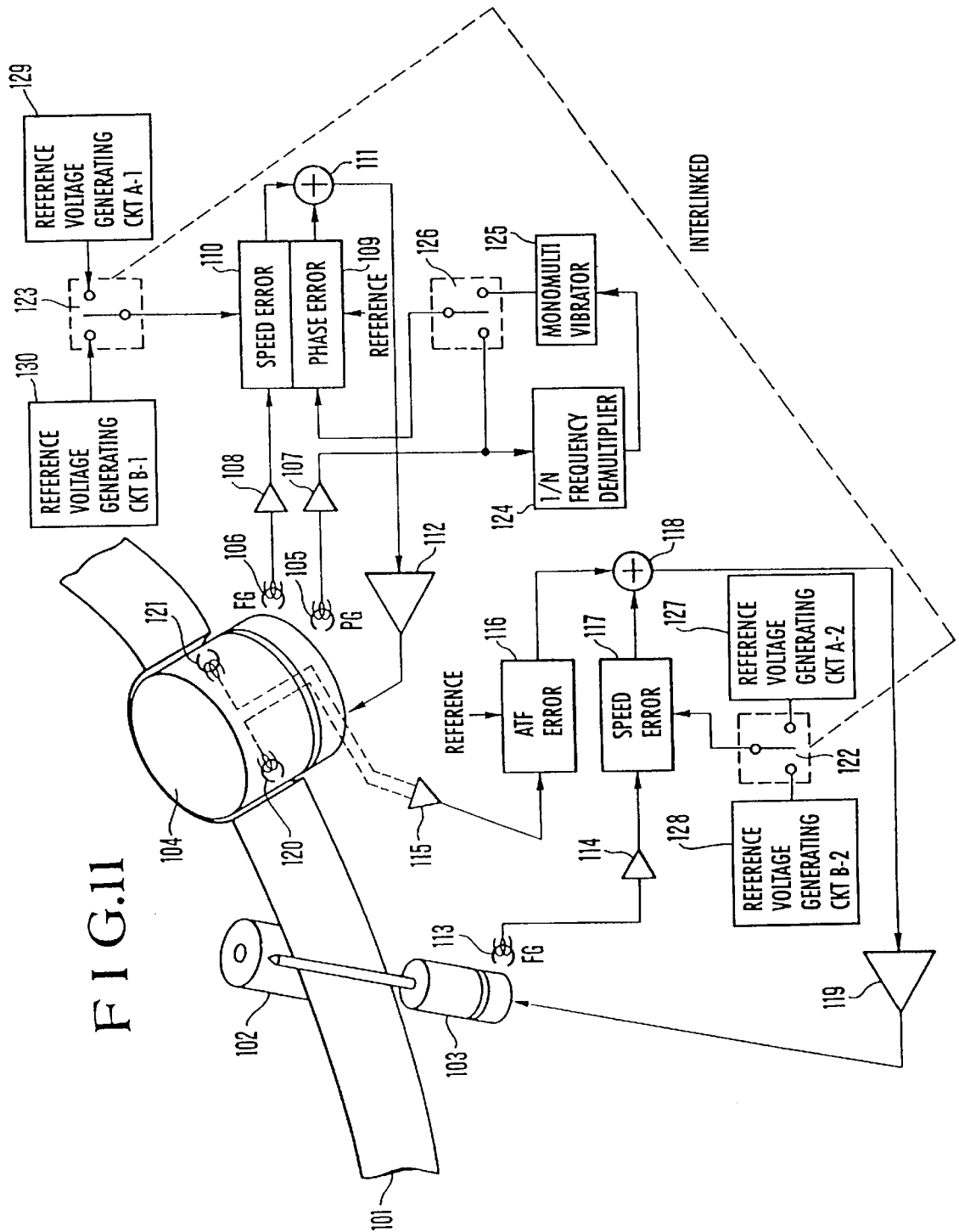
FIG. 11 is a diagram illustrating another example of the arrangement of a rotation control system of the recording apparatus shown in FIG. 3.

FIG. 11 is a block diagram illustrating another arrangement of a rotation control system of the apparatus of the embodiment shown in FIG. 3. In the drawing, reference numerals 122, 123 are switches for changing over a reference voltage; 124, a frequency demultiplier having a frequency demultiplying ratio of 1/N; 126, a switch interlinked with the switches 122, 123, and the same reference numerals as those of FIG. 1 denote the same or equivalent parts.

In FIG. 11, generating circuits 127, 128, 129, and 130 for generating two kinds of reference voltages of speed control reference voltages $A_1$, $A_2$ for standard speed ($A_1$ is for the drum, and $A_2$ for the capstan) and speed control reference voltages $B_1$, $B_2$ for high speed ($B_1$ is for the drum, and $B_2$ for the capstan) are prepared, and are changed over in an interlinked relationship with an operating unit (not shown). In addition, the processing speed of the PCM signal processing circuit 503 of the signal processing system is increased in an interlinked relationship with the same. In other words, the A/D converter 601 and the address generator (604 in FIG. 4), i.e., the control signal for reading the frame memory, are made compatible with high speed. Furthermore, the processing speed of the redundant data adding circuit 606 and the modulation circuit 607 is increased N-fold in comparison with the case where the PCM audio signal is processed.

Incidentally, description will be made of processing during digital recording of the drum PG with reference to FIG.

Figure 12:
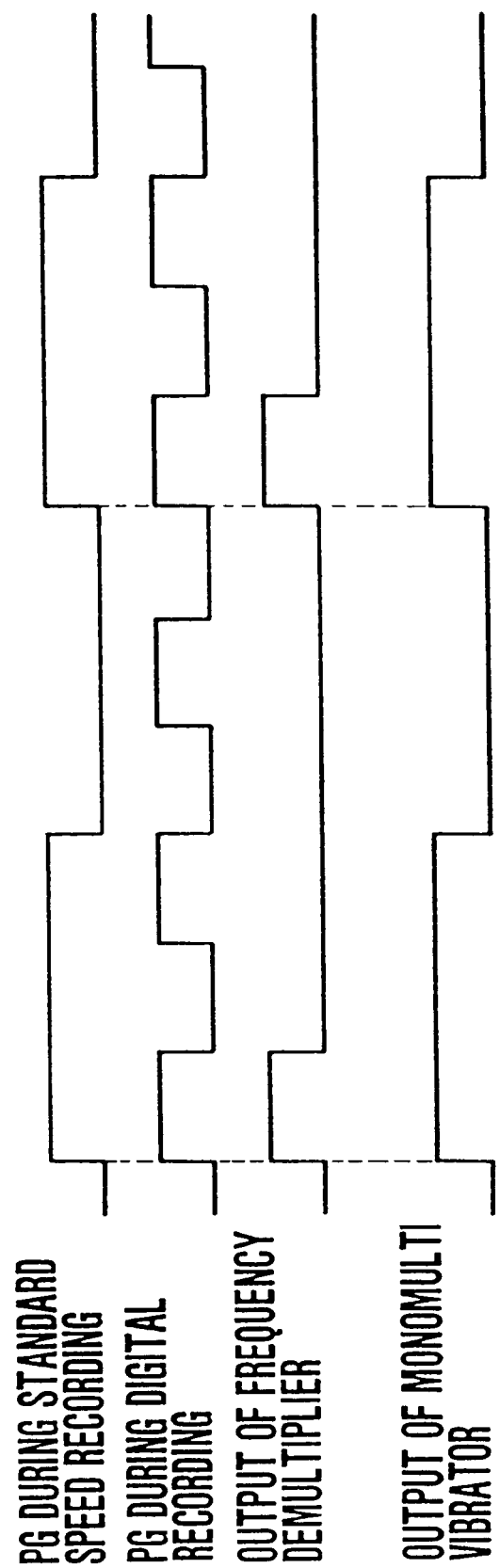
FIG. 12 is a timing chart illustrating the waveforms of components shown in FIG. 11.

12. FIG. 12 is a timing chart of the waveforms of the 30 Hz signal of the drum PG synchronized with the rotation of the rotary drum during normal analog recording and when the drum is rotated at a three-fold speed during digital recording as well as the waveforms of the outputs of the frequency demultiplier 124 and the monomulti vibrator 125 at that time. For instance, when the drum is rotated at a three-fold speed with N=3, the frequency demultiplication rate of the frequency demultiplier 124 is set at ⅓, a pulse train similar to that obtained in the case of standard rotation of the drum is obtained in combination with the monomulti vibrator 125.

In FIG. 11, the changeover of PG in the case of standard speed recording which is the output of the amplifier 107 as well as the processed pulse which is the output of the monomulti vibrator is effected by the switch 126 in an interlinked relationship with the other switches 122, 123.

Thus, it becomes possible to effect high-speed recording and reduction in the recording time.

As described above, in cases where the still picture and the motion picture are recorded simultaneously, since the still picture signal and the motion picture signal are obtained by the same pickup device and the like, image taking for recording the motion picture is not carried out during the time when the image-taking period for recording the still picture is long, i.e., when the shutter speed is slow. Therefore, a phenomenon in which motion picture signals during the meantime are not obtained (blackout) occurs, so that a disadvantage occurs during the recording of the motion picture.

With reference to drawings, description will be made hereafter of a still another embodiment of the present invention which overcomes this drawback.

Figure 13:
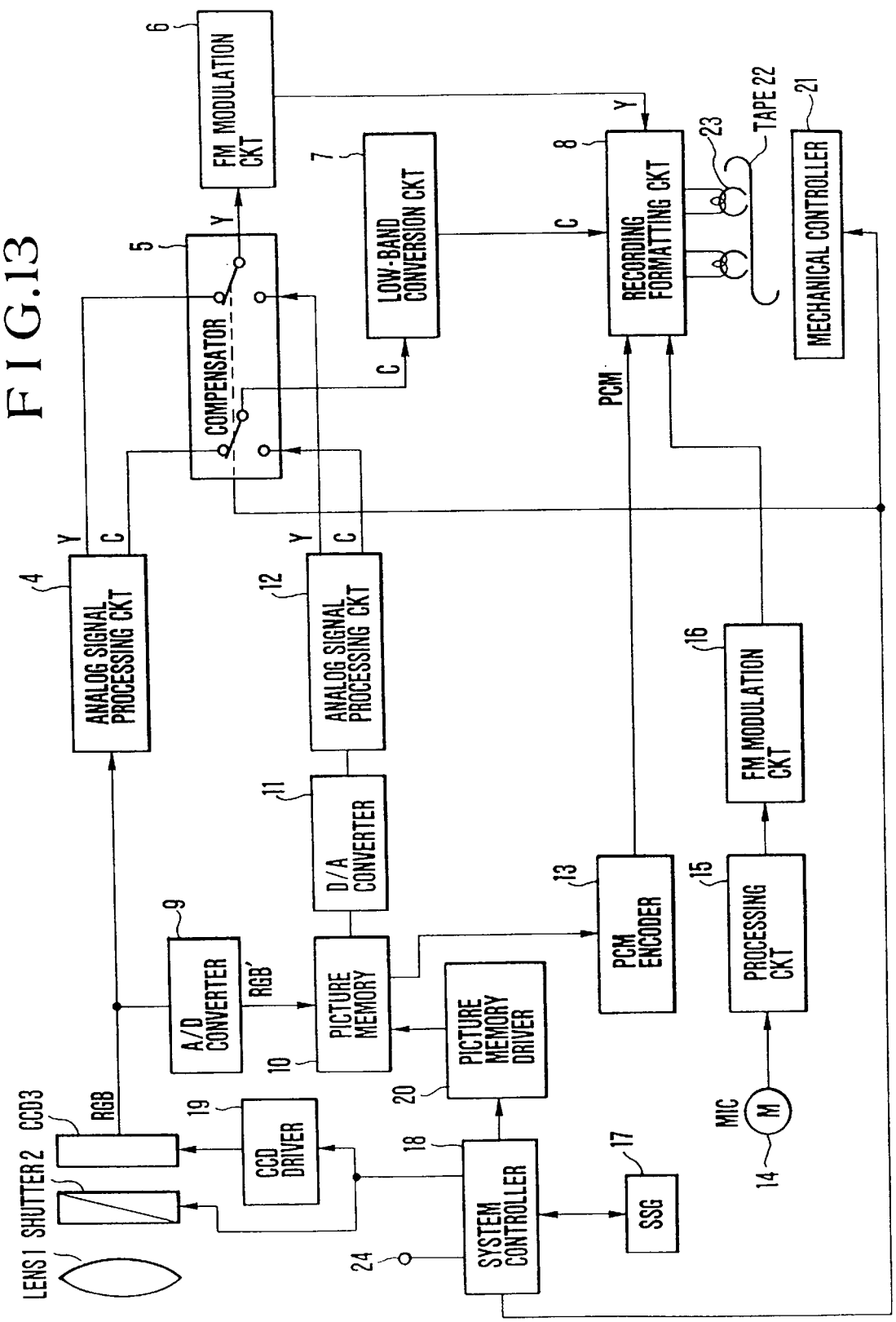
FIG. 13 is a schematic diagram of a recording apparatus in accordance with a still another embodiment of the present invention.

FIG. 13 is a block diagram of a camera-integrated-type VTR apparatus in accordance with the still another embodiment of the present invention.

In FIG. 13, reference numeral 1 denotes a lens, while numeral 3 denotes a charge coupled device (hereafter referred to as the "CCD") which is a pickup device disposed at the focal point of the lens 1. Reference numeral 2 denotes a shutter interposed between the lens 1 and the CCD 3. Incidentally, the shutter speed of the shutter 2 is set by a light-measuring means (not shown), and the set value is input to a system controller, which will be described later.

Figure 14:
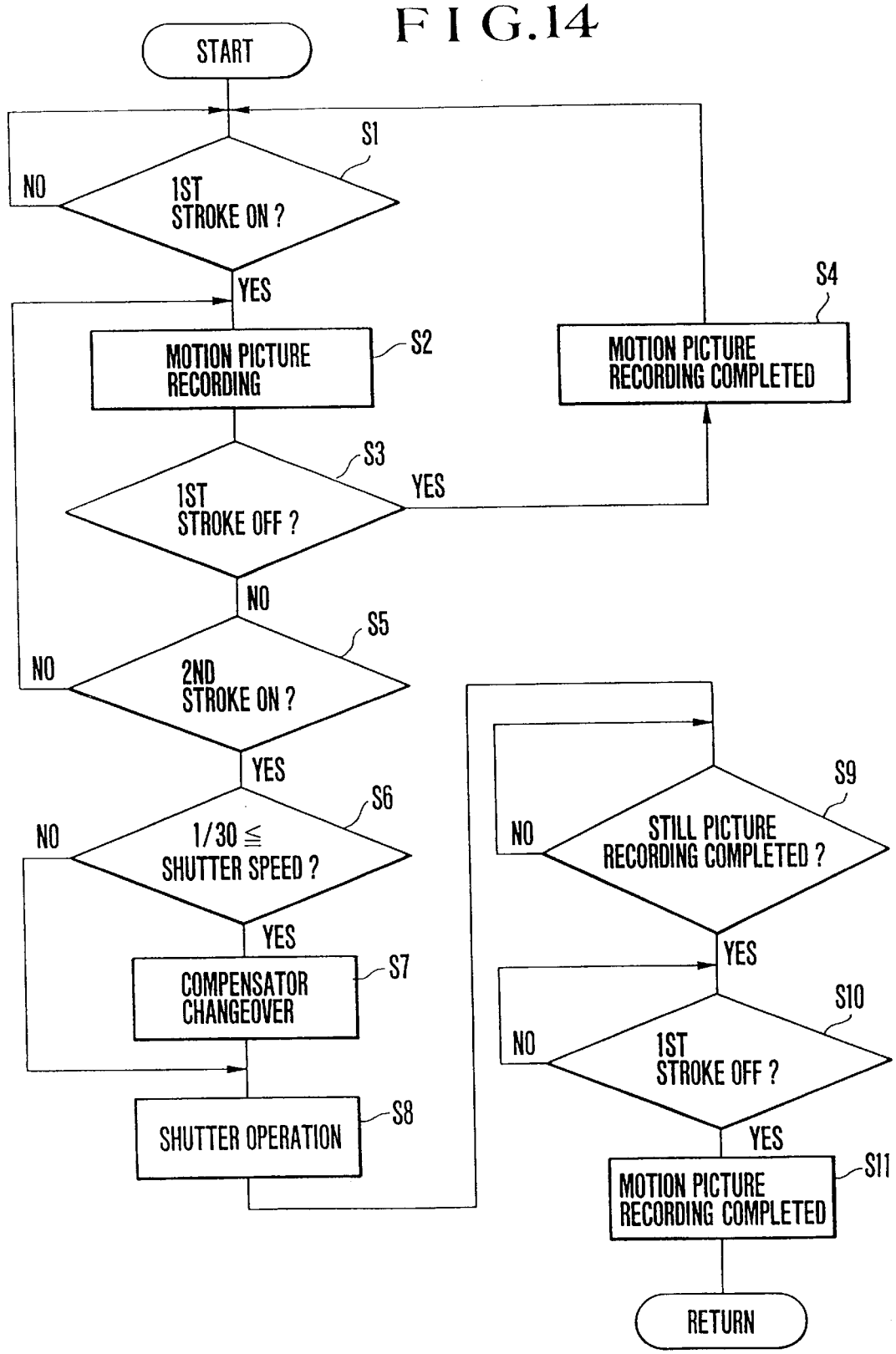
FIG. 14 is a flowchart explaining the operation of a system controller shown in FIG. 13.

The system controller 18 has a read only memory (hereafter referred to as the "ROM") in which a control procedure such as shown in FIG. 14 which will be described below. A synchronizing signal generator (hereafter referred to as the "SSG") 17 supplies to the system controller 18 signals necessary for controlling a CCD driver 19, a picture memory driver 20, a mechanical controller 21, etc. The CCD driver 19 drives the CCD 3 on the basis of scanning pulses supplied from the system controller 18. In addition, the system controller 18 controls a compensator 5 on the basis of data on shutter speed obtained from the shutter 2, an exposure system, etc. (not shown).

An analog signal processing circuit 4 converts three primary color signals RGB from the CCD 3 into a luminance signal Y and a chrominance signal C, and the output luminance signal Y and chrominance signal C are input to one input terminal of the compensator 5.

An analog/digital (A/D) converter 9 converts the three primary color signals RGB from the CCD 3 into digital three primary color signals RGB'.

A picture memory 10 stores the three primary color signals RGB' converted by the A/D converter 9 into digital signals, using a frame or field period as a unit.

The picture memory driver 20 drives the picture memory 10 on the basis of a control signal transmitted from the system controller 18. One portion of the digital three primary color signals RGB' from the picture memory 10 is input to a digital/analog (D/A) converter 11, while the other portion is input to a pulse code modulation (PCM) encoder 13. The three primary color signals RGB converted to analog signals by the D/A converter 11 are input to an analog signal processing circuit 12 where they are converted into the luminance signal Y and the chrominance signal C, which are input to the other input terminal of the compensator 5.

Reference numeral 6 denotes an FM modulation circuit for frequency modulating the luminance signal Y transmitted from an output terminal of the compensator 5 so that the luminance signal Y becomes suitable for recording. Reference numeral 7 denotes a low-band conversion circuit for converting the chrominance signal C supplied from an output terminal of the compensator 5 into low frequency so that the chrominance signal C becomes suitable for recording. The PCM encoder 13 codifies the digital three primary color signals RGB' supplied from the picture memory 10 so that the signals RGB' become suitable for recording on a magnetic tape 22 as a recording medium.

A microphone 14 collects sound signals. A processing circuit 15 amplifies signals supplied from the microphone 14, while an FM modulation circuit 16 modulates signals sent from the processing circuit 15.

Reference numeral 23 denotes a rotary magnetic head, while numeral 8 denotes a formatting circuit, which inputs the luminance signal from the FM modulation circuit 6 and the chrominance signal from the low-band conversion circuit 7 as the motion picture signal, inputs the PCM signal from the PCM encoder 13 as the still picture signal, inputs the audio signal supplied from the FM modulation circuit 16, and then formats these signals into such signals that are suitable for recording on the magnetic tape 22. For instance, when correspondence is made with the so-called 8 mm video standards, the motion picture signal and the audio signal are frequency multiplied and recorded on video+FM audio tracks of the magnetic tape 22 by the rotary magnetic head 23, while the stationary picture signals are recorded on tracks (PCM audio tracks) on the extension of the video+FM audio tracks of the magnetic tape 22 by the rotary magnetic head 23. Incidentally, the travel of the magnetic tape 22 is controlled by the mechanical controller 21.

Reference numeral 24 denotes a shutter release button having two-stage strokes that are turned ON consecutively on depression. The ON-OFF signals of the first stroke and the second stroke are input to the system controller 18. On receiving the ON signal of the first stroke of the shutter release button 24, the system controller 18 releases the shutter 2 to start the shooting of the motion picture. In other words, with the first stroke of the shutter release button 24 turned ON, the CCD 3 is driven by the driver 19 to shoot an object, and its pickup signal is input to the analog signal processing circuit 4 and the A/D converter 9. The luminance signal Y and the chrominance signal C are output to one input terminal of the compensator 5 from the analog signal processing circuit 4, while the pickup signal input to the A/D converter 9 is subjected to A/D conversion there. Subsequently, the pickup signal is stored temporarily in the picture memory 10, is taken out from the memory 10 by lagging behind by one picture period, and is converted into an analog signal by the D/A converter 11. This analog signal is converted into the luminance signal Y and the chrominance signal C by the analog signal processing circuit 12 and is supplied to the other input terminal of the compensator 5.

Accordingly, the luminance and chrominance signals of both the present and previous pictures have been supplied to the input terminals of the compensator. When the first stroke of the shutter release button 24 is turned ON, the signals of the present picture from the compensator 5, i.e., the luminance and chrominance signals from the analog signal processing circuit 4, are supplied to the FM modulation circuit 5 and the low-band conversion circuit 7, while output signals from both circuits 6, 7 are input to a recording formatting circuit 8 and are recorded in the motion picture recording region of the magnetic tape 22 by that circuit 8.

In addition, the system controller 18 controls the picture memory driver 20 in such a manner that the pickup signals from the A/D converter 9 are stored in the picture memory 10 during one picture period (e.g., one frame or field period).

Then, the still picture recording is effected by depressing the shutter release button 24 down to the second stroke. In other words, on receiving the ON signal of the second stroke of the button 24, the system controller 18 temporarily closes the shutter 2, and, after releasing it for a required time, exposes the CCD 3. On completion of this exposure, the three primary color signals RGB read from the CCD 3 are stored temporarily in the picture memory 10 via the A/D converter 9. These signals RGB are read from the picture memory by the picture memory driver 20 over a time longer than the motion picture recording time, and are codified in a prescribed coding form by the PCM encoders 13 before being recording on extension tracks on the magnetic tape 22 by the recording formatting circuit 8.

Incidentally, when the shutter speed (the release time of the shutter 2) is faster than $1/30$ sec. (one frame period), no hindrance occurs to the formation of the motion picture signal, so that the signal taken out from the CCD 3 via the analog signal processing circuit 4 and the compensator 5 is recorded on the magnetic tape 22 as the motion picture signal.

In addition, when the release time of the shutter 2 as a result of the turning ON of the second stroke of the shutter release button 24 is longer than $1/30$, i.e., when the shutter speed is slower, the system controller 18 controls the compensator 5 while the shutter 2 is open, takes out from the picture memory 10 via the D/A converter 11, the analog signal processing circuit 12, and the compensator 5, the signal which corresponds to the picture obtained immediately before the shutter 2 is released, and records it in the motion picture signal recording area. This arrangement makes it possible to eliminate the following drawback. In other words, when the shutter speed is longer than $1/30$ sec., signals cannot be read from the CCD 3 during the exposure, and a so-called blackout occurs during reproduction of the motion picture unless some measure is taken. For this reason, as described above, when the shutter speed is longer than $1/30$ sec., the pickup signal stored in the picture memory 10 is taken out during the exposure at a synchronizing timing for ordinary motion picture signals so as to form recording picture signals, and, by recording these signals it becomes possible to reproduce a motion picture which is free of a blackout.

Next, description will be made of the main operation of the system controller 18 with reference to the flowchart shown in FIG. 13.

First, a judgment is made in Step S1 as to whether or not the first stroke of the shutter release button 24 is ON, and, if ON, the operation proceeds to Step S2 to record the motion picture signal. Subsequently, a judgment is made in Step S3 as to whether or not the first stroke of the shutter release button 24 is OFF, and, if OFF, the operation proceeds to Step S4 to complete the recording of the motion picture signal and returns to Step S1. On the other hand, if not OFF, the operation proceeds to Step S5, where a judgment is made as to whether or not the second stroke of the shutter release button 24 is ON, and, if OFF, the operation returns to Step S2. If ON, the operation proceeds to Step S6 to judge whether or not the set shutter speed is slower than $1/30$ sec. If not slower, the operation proceeds to Step S8, and, if slower, proceeds to Step S7 and changes over the compensator 5 to the input terminal for inputting the signal from the memory 10 before proceeding to Step S8.

In Step S8, the shutter 2 is operated at a preset speed to expose the CCD 3, and the operation proceeds to Step S9. Incidentally, the picture data stored in the CCD 3 by the operation of the shutter 2 is read by the picture memory 10 at the first transmission timing immediately after the closing of the shutter 2 upon completion of the operation. This picture data is then read by the PCM encoder 13 from the picture memory 10 for a fixed time, and the recording of the still picture is effected. In Step S9, the motion picture recording is continued until the still picture recording is completed. Accordingly, even if the first stroke of the shutter release button 24 is set to OFF during the meantime, the motion and still picture recording is carried out. Then, a judgment is made in Step S10 as to whether or not the first stroke is OFF, and, if OFF, the operation proceeds to Step S11, and the recording of the motion picture is hence completed.

As described above, before effecting the still picture recording, the magnetic tape 22 is loaded and the motion picture is recorded without fail.

In addition, while the still picture signal is being recorded in the PCM region of the tape 22 from the picture memory 10 via the PCM encoder 13, even if, for instance, the shutter release button 24 is returned to the first stroke by mistake, the tape 22 is fed automatically and both the motion and still pictures are recorded simultaneously. Accordingly, since the motion picture signal is recorded without fail substantially simultaneously with the recording of the still picture signal, this arrangement is advantageous in the retrieval of the still picture during reproduction. Incidentally, during reproduction, if the so-called high-speed picture search is carried out for the motion picture, it is readily possible to retrieve a still picture. For example, a 30 min. tape is fed at a 10-fold speed, the entire tape can be viewed in three minutes. If one still picture is recorded in relation to a 30 sec. period for the motion picture, 60 still pictures can be recorded on the 30 min. tape, and since these still pictures can be retrieved in three minutes, this arrangement has a substantial advantage in terms of practical application.

It should be noted that, in the foregoing description of the embodiment, the shutter 2 is operated with two strokes, but it goes without saying that a shutter may be provided separately for the use of motion pictures and for the use of still pictures. In that case, ease in operation can be facilitated if some indication is given that the still picture recording is possible until the shutter for the still picture becomes operable, i.e., until a loading is completed. This also applies to the case of the shutter release button using two strokes, but a more positive operation can be carried out if the shutter is provided separately for both the motion picture use and the still picture use.

What is claimed is:

1. A video signal recording apparatus, comprising:
   (a) input means for inputting a moving picture signal representing a moving picture;

(b) memory means arranged to receive the moving picture signal input by said input means, said memory means being able to output a still picture signal representing one picture of the moving picture;

(c) processing means arranged to receive the moving picture signal for producing a first recording signal and arranged to receive the still picture signal for producing a second recording signal, said second recording signal having a data train which sequentially includes digital still picture data and digital identification data which indicates whether or not the second recording signal includes the still picture data; and (d) recording means for recording signals on helical tracks formed on a tape-shaped recording medium, said recording means recording said first and second recording signals in distinct areas of the recording medium such that the second recording signal corresponding to one still picture is divided into a plurality of portions which are recorded on a plurality of helical tracks respectively and the identification data is recorded together with an error correction code on each of the plurality of helical tracks where then plurality of portions are recorded.

2. An apparatus according to claim 1, wherein said processing means is arranged to receive an audio signal and to produce the second recording signal which selectively includes the still picture signal and the audio signal.

3. An apparatus according to claim 2, wherein the identification data further indicates whether or not the second recording signal includes the audio signal.

4. An apparatus according to claim 3, wherein said processing means includes a time-base compressing circuit for time-base compressing the audio signals of every of the predetermined period.

5. An apparatus according to claim 1, further comprising manually operable means arranged to instruct recording of still picture image, and to output an instruction signal.

6. An apparatus according to claim 5, wherein said memory means is arranged to receive the instruction signal from said manually operable means and to output the still picture signal in response to the instruction signal.

7. An apparatus according to claim 1, wherein said recording means includes a rotary head arranged to form said helical tracks each of which has first and second areas.

8. An apparatus according to claim 1, wherein said input means includes an image pick-up means for converting an optical image into an electric signal as the video signal.

9. An apparatus according to claim 1, wherein said memory means includes an analog to digital converter arranged to receive the video signal input by said input means, and said memory means is arranged to output a digitized still picture signal to said processing means.

10. A video signal recording apparatus according to claim 1, wherein said second processing means includes a process circuit which commonly handles both of digital still picture data and digital identification data.

11. A video signal recording apparatus according to claim 10, wherein the process circuit executes a digital modulation.

12. A video signal recording apparatus according to claim 10, wherein the process circuit executes error correction code encoding.

13. A video signal recording apparatus according to claim 1, wherein the data train sequentially includes synchronizing data, the still picture data and the identification data, and said recording means records said data train in such a manner that the still picture data sequentially follows the synchronizing data and the identification data of the plurality of helical tracks.

14. A video signal recording apparatus, comprising:

(a) an image sensing device for producing a moving picture signal representing a moving picture;

(b) a memory circuit arranged to receive the moving picture signal produced by said image sensing device and to output a still picture signal representing one picture of the moving picture;

(c) a processing circuit arranged to receive the moving picture signal for producing a first recording signal; and arranged to receive the still picture signal for producing a second recording signal, said second recording signal having a data train which sequentially includes digital still picture data and digital identification data indicating whether or not the second recording signal includes the still picture data; and (d) recording heads for recording signals on helical tracks formed on a tape-shaped recording medium, said recording heads recording said first and second recording signals in distinct areas of the recording medium, such that the second recording signal corresponding to one still picture is divided into a plurality of portions which are recorded on a plurality of helical tracks respectively and the identification data is recorded, together with an error correction code on each of the plurality of helical tracks where the plurality of portions are recorded.

15. A video signal recording apparatus according to claim 14, wherein the data train sequentially includes synchronizing data, the still picture data and the identification data, and said recording heads record said data train in such a manner that the still picture data sequentially follows the synchronizing data and the identification data on each of the plurality of helical tracks.

16. A video signal recording apparatus, comprising:

(a) input means for inputting a moving picture signal representing a moving picture;

(b) memory means arranged to receive the moving picture signal input by said input means, said memory means being able to output a still picture signal representing one picture of the moving picture;

(c) first processing means arranged to receive the moving picture signal for producing a first recording signal;

(d) second processing means arranged to receive the still picture signal for producing a second recording signal, said second recording signal having a data train which sequentially includes synchronizing data, digital still picture data and digital identification data which indicates whether or not the second recording signal includes the still picture data; and (e) recording means for recording signals on helical tracks formed on a tape-shaped recording medium, said recording means recording said first and second recording signals in distinct areas of the recording medium such that the still picture data corresponding to one still picture is divided into a plurality of groups which are recorded on a plurality of helical tracks respectively and the still picture data sequentially follows the synchronizing data and the identification data on each of the helical tracks where the picture data are recorded.

* * * * *

UNITED STATES PATENT AND TRADEMARK OFFICE
CERTIFICATE OF CORRECTION

PATENT NO. : 5,913,011
DATED : June 15, 1999
INVENTOR(S) : Yoshitake Nagashima, et al.

It is certified that error appears in the above-identified patent and that said Letters Patent is hereby corrected as shown below:

Col. 6, line 21, delete "a".
Col. 9, line 31, delete "a".
Col. 11, line 28, delete "recording" and insert -- recorded --.
Col. 11, line 62, delete "FIG. 13" and insert -- FIG. 14 --.

Signed and Sealed this

Fourth Day of July, 2000

Attest:

Attesting Officer

Q. TODD DICKINSON
Director of Patents and Trademarks